United States Patent
Ully et al.

(10) Patent No.: US 8,336,924 B2
(45) Date of Patent: Dec. 25, 2012

(54) COUPLING DEVICE FOR TRANSFERRING FLUID, CIRCUIT INCORPORATING AND FITTING/REMOVING IT

(75) Inventors: Stéphane Ully, Fontenay sur Loing (FR); Damien Gillet, Chateau-Renard (FR)

(73) Assignee: Hutchinson, Paris (FR)

( * ) Notice: Subject to any disclaimer, the term of this patent is extended or adjusted under 35 U.S.C. 154(b) by 355 days.

(21) Appl. No.: 12/718,275

(22) Filed: Mar. 5, 2010

(65) Prior Publication Data
US 2010/0225104 A1 Sep. 9, 2010

(30) Foreign Application Priority Data
Mar. 5, 2009 (FR) ................................ 09 01020

(51) Int. Cl.
*F16L 37/00* (2006.01)
(52) U.S. Cl. .................................. 285/305; 285/319
(58) Field of Classification Search ............. 285/921, 285/305, 319, 293.1
See application file for complete search history.

(56) References Cited

U.S. PATENT DOCUMENTS

| | | | | | |
|---|---|---|---|---|---|
| 3,810,073 | A | * | 5/1974 | Zajac et al. ............... | 439/352 |
| 4,111,530 | A | * | 9/1978 | Fuehrer et al. ............ | 359/829 |
| 4,266,814 | A | * | 5/1981 | Gallagher ................. | 285/319 |
| 4,673,010 | A | * | 6/1987 | Prufer et al. .............. | 141/382 |
| 4,828,297 | A | * | 5/1989 | Tarum ...................... | 285/305 |
| 5,004,272 | A | * | 4/1991 | Kipp ........................ | 285/24 |
| 6,290,525 | B1 | * | 9/2001 | Jacobi ...................... | 439/319 |
| 6,447,024 | B1 | * | 9/2002 | Olson ....................... | 285/319 |
| 7,249,788 | B2 | * | 7/2007 | Muhammad et al. ...... | 285/319 |
| 7,810,848 | B2 | * | 10/2010 | Yoshino ................... | 285/305 |
| 7,857,360 | B2 | * | 12/2010 | Lambert et al. .......... | 285/322 |
| 7,866,710 | B2 | * | 1/2011 | Sheppard et al. ......... | 285/319 |

FOREIGN PATENT DOCUMENTS

| | | |
|---|---|---|
| CA | 2 457 978 | 8/2005 |
| DE | 10 2006 040051 A1 | 4/2007 |
| FR | 1 505 986 | 12/1967 |
| FR | 2 146 775 | 3/1973 |
| WO | WO 2007/042344 | 4/2007 |

OTHER PUBLICATIONS

Search Report for Application No. FR 0901020 dated Dec. 21, 2009.

* cited by examiner

*Primary Examiner* — Aaron Dunwoody
(74) *Attorney, Agent, or Firm* — Alston & Bird LLP

(57) ABSTRACT

Coupling device is provided having a male tubular end fitting; a connection mechanism to be mounted around the male end fitting by being coupled to a female end fitting and including a coupling end to be housed in a groove of the female end fitting; and a locking member for locking this connection mechanism that is to be mounted around the male end fitting in order reversibly to bring the coupling end into a locked position in the groove. The connection mechanism includes a radially internal bearing zone to be mounted against the male end fitting and ending in the coupling end, which includes tabs that are elastically deformable in the radial direction extending the bearing zone, each tab being able to be jammed in the locking position by flexing against the groove and against one of the guide and locking-aid ramps of the male end fitting.

17 Claims, 4 Drawing Sheets

COUPLING DEVICE FOR TRANSFERRING FLUID, CIRCUIT INCORPORATING AND FITTING/REMOVING IT

CROSS REFERENCE TO RELATED APPLICATION

This application claims priority from French application Ser. No. 09/01020, filed Mar. 5, 2009, which is hereby incorporated herein in its entirety by reference.

BACKGROUND

The present invention relates to a coupling device for a fluid transfer line, to a fuel injector return circuit incorporating it, and to a method for fitting/removing this device around a male tubular end fitting and into/from in a female tubular end fitting that is to be coupled to this male end fitting. The invention applies in general to any couplings between such end fittings that transfer a fluid, particularly at low pressure, and notably to fuel injection line sets for motor vehicles.

In general, it is known practice for fuel injection line sets to use coupling devices involving a male tubular end fitting that is pushed in a leaktight manner into a female tubular end fitting or "canular" by means of a flexible linking member which is mounted securely on the male end fitting and which can be locked at its axially inner end into an internal circumferential groove of the female end fitting under the control of a locking member collaborating with an axially outer part of this linking member.

Mention may, for example, be made of document WO-A-2007/042344 which discloses such a device in which the linking member comprises two diametrically opposite axial arms which are formed as a single piece with the male end fitting and which lock elastically into the groove of the female end fitting by a bending force applied to them in the radial direction, that prevents them from being pulled axially outward.

One major disadvantage of these known coupling devices is that when the male end fitting is locked into the female end fitting when the linking member is not positioned in the coupling groove of the female end fitting, it is no longer subsequently possible to bring the linking member into this groove.

One other disadvantage of these known devices is that they all require two separate components (i.e. a linking member that makes the connection in the groove of the female end fitting and a locking member for locking this linking member), which means that the operation of assembling these components is not always easy and furthermore the cost of the device is relatively high notably because of the use of different materials for these components.

BRIEF SUMMARY

It is one object of the present invention to propose a coupling device for a fluid transfer line, particularly a low-pressure line, which overcomes these disadvantages and which comprises:
- a male tubular end fitting,
- a connection means intended to be mounted around the male end fitting by being coupled to a female tubular end fitting by a radially internal face thereof, this means of connection comprising an axially interior coupling end able to become housed in a coupling groove of this internal face, and
- a locking member for locking this connection means, which member is intended to be mounted around the male end fitting in order reversibly to bring said coupling end into a locked position in said groove.

To this end, a device according to the invention is such that the connection means is formed as a single piece with the locking member of which it forms an axially interior end, this connection means comprising a radially internal bearing zone intended to be mounted against the male end fitting and ending in said coupling end, which comprises at least two tabs that are elastically deformable in the radial direction and extend the bearing zone radially outward, the radially external face and internal face of each tab being able to be jammed in the locked position, by a flexing of each tab, respectively against said groove and against one of the corresponding guide and locking-aid ramps that the male end fitting has and which are respectively associated with said tabs.

In the present description, the expressions "axially inner" or "axially inward" will mean a location in the coupled state along the axis of symmetry of the male and female end fittings which faces toward the inside of the coupling, i.e. is proximal in relation to the coupling groove of the female end fitting and, conversely, the expressions "axially outer" or "axially outward" will mean a location along this axis in the opposite direction to (i.e. distal in relation to) this groove.

It will be noted that these tabs that are elastically deformable under flexion forming the coupling end of the locking member according to the invention have the advantage of low cost and ease of fitting of the coupling device by comparison with the known two-component devices and also play a part in conferring mechanical resistance to being pulled out (i.e. to this coupling end up out of the groove of the female end fitting at an inopportune moment) which is enhanced by comparison with that of the aforementioned known devices, thus contributing to the reliability of the coupling even under high operating fluid pressure.

In addition, and in contrast to the aforementioned prior art, a coupling device according to the invention makes it possible, even if the male end fitting is initially locked in the female end fitting without the connection means being correctly positioned in the coupling groove, for subsequent positioning in this groove to remain possible.

It will also be noted that this coupling end according to the invention with tabs that are flexible in the radial direction can precisely be guided into the groove by said ramps, just before it is jammed in the locked position in this groove, something of which can be performed only when this positioning has been achieved, and which is also achieved by means of these ramps.

It will also be noted that the coupling device according to the invention is able to perform a "self-locking" function when the coupling of the male end fitting in the female end fitting in the locking position is in operation, thanks to the radial compression force applied by these ramps to the coupling tabs pressing into the groove of the female end fitting and which force increases with increase in the pressure of the fluid flowing through the male end fitting. This results in improved operational dependability of this device, even under high pressures.

According to another feature of the invention, each coupling tab preferably has on its internal face an oblique or slightly concave surface intended to be mounted in contact with an edge face of said corresponding ramp in the locked position, and on its external face a convex surface, the radius of curvature of which is able substantially to espouse the profile of said groove in this position.

It will be noted that these coupling tabs advantageously have a small thickness to allow them to be deformed radially.

Advantageously, the external face of each tab may comprise two, axially outer and inner oblique sections and an intermediate third section which are respectively intended to espouse two flared edges and a flat bottom of said groove.

According to another feature of the invention, said coupling tabs may each be circularly arcuate and joined together by so many notches that are designed to make these tabs sufficiently deformable in terms of radial bending.

According to another feature of the invention, the locking member may essentially have:
 a radially internal annular portion which is intended to be mounted in contact with the male end fitting and which has an internal diameter greater than that of said bearing zone that this portion surmounts, and
 grasping means forming an axially outer end of the locking member, there preferably being two of these diametrically opposed, these means each having a radial thrusting surface which is intended to receive a manual thrust from an operator toward the female end fitting and which is supported and connected to this annular portion by a linking portion extending axially and radially inward.

It will be noted that because this locking member is not in contact with the fluid, such as a fuel, the material of which it is made can be selected to exhibit optimum mechanical properties such that its axially inner coupling tabs deform elastically in bending. Advantageously, this linking member is made of a plastic, such as a polyamide, this being a nonlimiting example.

According to another preferred feature of the invention, at least one means of making the coupling of the connection means to said groove more secure may be formed on the locking member in the immediate vicinity of its grasping means and be designed to be wedged directly under at least one radial projection of the male end fitting in the locked position so as to oppose extraction of said coupling tabs from the groove by a riding-up of the locking member in relation to the male end fitting. The or each radial projection may be formed of a retaining tooth which extends a central bearing surface of the male end fitting radially outward and under which there can be wedged, by clipping, at least one tongue that extends one of the grasping means radially inward and thus forms this/these means of making the coupling more secure by an upper stop acting like a safety catch.

It will be noted that the coupling device according to the invention thus advantageously improves the secureness of the connection of its coupling end to the female end fitting via the ramps jamming the tabs in the groove, on the one hand, and via the or each tongue collaborating in clip fastening with a corresponding radial projection of the male end fitting, on the other hand. This preferred device of the invention with more secure coupling has thus highly satisfactory mechanical pull-out resistance, being able to withstand high pressure.

Advantageously also, the locking member may further incorporate, preferably in combination with this/these means of making the coupling more secure, a visual locking indicator which is respectively visible and nonvisible on the male end fitting in the unlocked and locked positions and which preferably comprises at least one axial pin which is formed as a single piece with the locking member at its axially outer end, being capable of translational movement inside a housing that opens onto a bearing surface of the male end fitting.

According to another aspect of the invention, the said male end fitting on which the locking member is mounted has said ramps projecting radially, spaced apart around its circumference and at the same axial height, each ramp preferably having:
 an upper oblique portion extending radially outward and axially inward at an acute angle as far as said edge face, and
 an axial portion extending axially inward from this edge face, each tab in the locked position straddling these two upper and axial oblique portions on either side of this edge face so that these ramps alone during operation jam the corresponding tabs in said groove, deforming them radially outward.

According to one exemplary embodiment of the invention, the ramps each end in a lower oblique portion and are preferably two in number, being positioned diametrically opposite each other on the male end fitting just like the tabs that are intended to come into contact with them in the locked position.

According to another feature of the invention, the male end fitting may further comprise, between these ramps, centering means which are able to angularly guide this male end fitting translationally in the female end fitting to facilitate centering of the coupling tabs on entering said groove, and which preferably comprise axial ribs.

According to another feature of the invention, the coupling device further comprises at least one seal, preferably an O ring, which can be mounted or overmolded in a sealing groove of the male end fitting adjacent to an axially interior end of this male end fitting and which is intended to be pressed against the female end fitting.

A fuel injector return circuit according to the invention comprises a male tubular end fitting coupled to a female tubular end fitting by a coupling device according to the invention as defined hereinabove.

A method for fitting/removing a coupling device according to the invention as defined hereinabove in the locking position in a female tubular end fitting that is to be coupled to a male end fitting that this device comprises, comprises the following successive steps for fitting the device:
 a) the locking member is positioned around the male end fitting, preferably in such a way that said coupling tabs are situated over said ramps,
 b) the male end fitting is pushed right into the female end fitting to connect it thereto in such a way that these tabs are situated immediately over said coupling groove,
 c) thrust is applied axially inward to the locking member to bring these tabs into the locked position, through their radial deformation in bending in contact with said ramps, then
 d) in order to unlock the device, an outward axial pulling force is applied to the locking member while keeping the male end fitting pushed against the end of the female end fitting.

Advantageously, in order to perform step c), the aforementioned means of making the coupling more secure that the locking member exhibits is/are brought under said radial projection(s) of the male end fitting, preferably by clipping of at least one tongue that forms this means under a corresponding retaining tooth that forms the or each projection.

BRIEF DESCRIPTION OF THE DRAWINGS

Further features, advantages and details of the present invention will emerge from reading the following description of an exemplary embodiment of the invention which is given by way of nonlimiting illustration, this description being given with reference to the attached drawings, among which.

DETAILED DESCRIPTION

Figure 2:
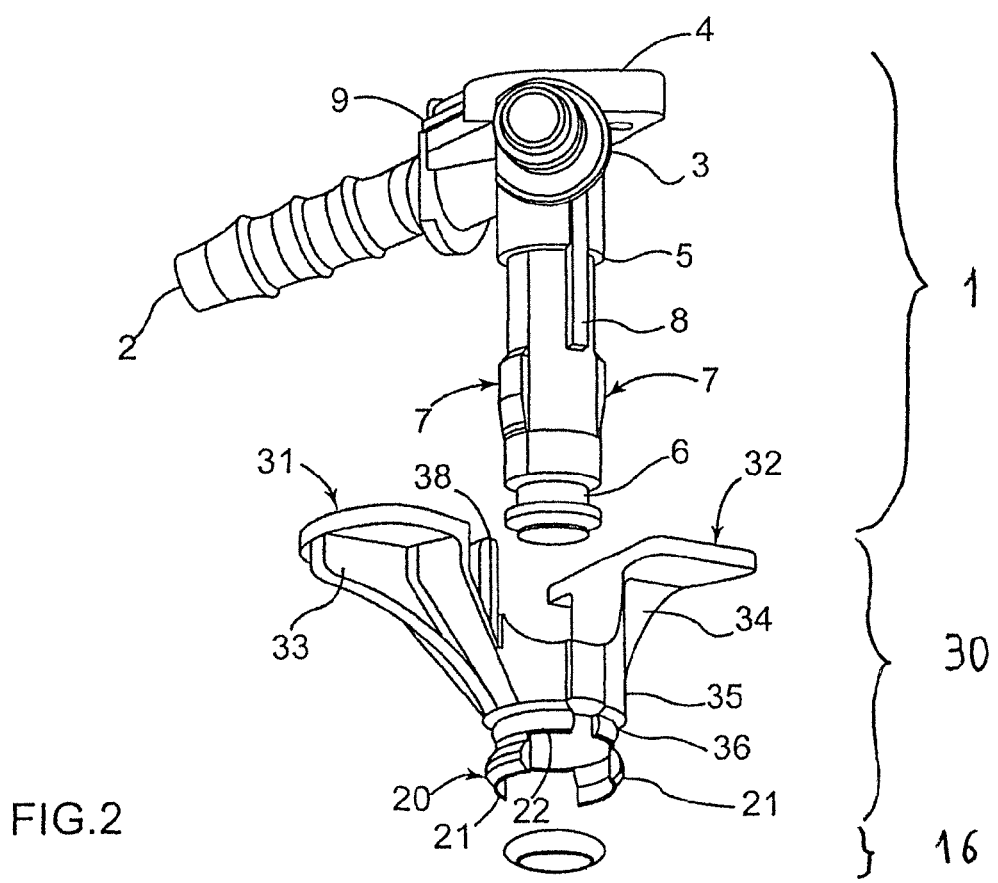
FIG. 2 is an exploded perspective view of a coupling device according to the invention intended to be fitted into the female end fitting of FIG. 1, this device being intended to be mounted around a male end fitting provided with a seal.
Figure 3:
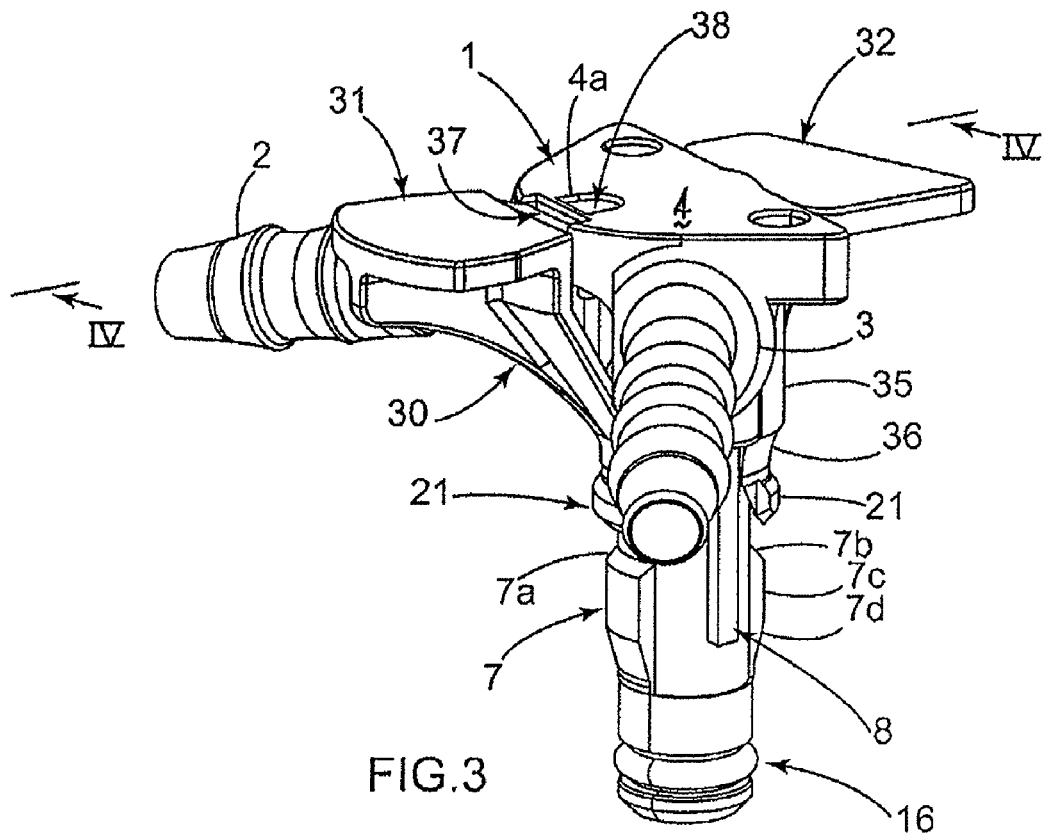
FIG. 3 is an assembled perspective view of the device of FIG. 2 mounted on the same male end fitting in a position in which its coupling end is not locked to the female end fitting.
Figure 4:
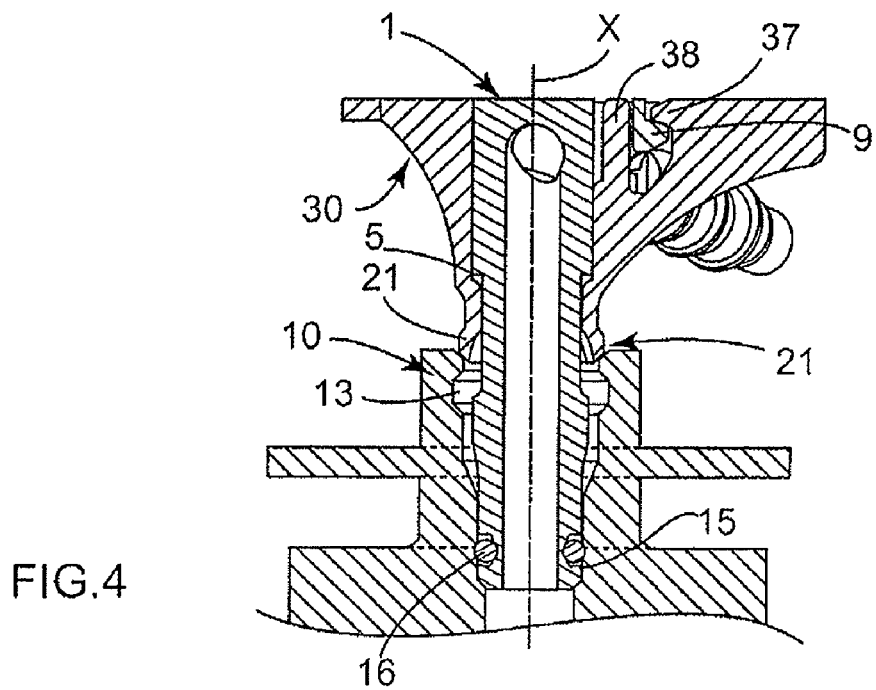
FIG. 4 is a view in axial section on IV-IV of FIG. 3 of this device illustrated in this unlocked position inside the female end fitting.

The male tubular end fitting 1 illustrated notably in FIGS. 2 to 5 has, in the known way, at its axially outer (i.e. upper) end two christmas tree-shaped connection couplings 2 and 3 running symmetrically in relation to one another with respect to a bearing surface 4 for the operator that this end fitting 1 has and which is centered on the axis X thereof (see FIG. 4). The end fitting 1 also has a circumferential radial discontinuity 5 (see FIGS. 2 and 4) to assist with the fitting of the device 1.

Figure 1:
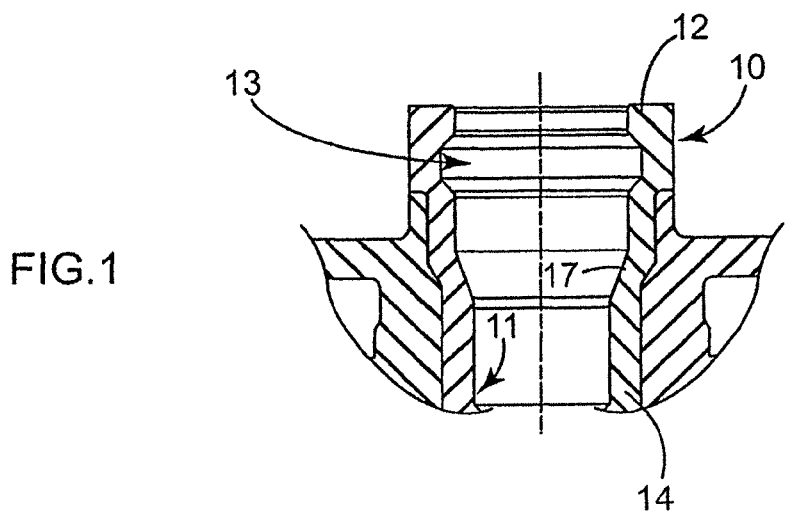
FIG. 1 is a partial view in axial section of a female end fitting in which a coupling device according to the invention is intended to be fitted.

The female tubular end fitting 10 illustrated in FIG. 1, of the canular type and of standard shape, essentially has, on its radially internal face 11, in the immediate vicinity of its axially upper end 12, a circumferential coupling groove 13 which is of substantially trapezoidal axial section and intended to accept an axially inner (i.e. lower in FIG. 2 et seq.) coupling end 20. The female end fitting 10 also has, in the immediate vicinity of its axially inner end 14, a circumferential sealing zone 15 (visible in FIG. 4) intended to accept an O-ring seal 16 (visible in FIG. 2 et seq.) which is mounted or overmolded beforehand in a circumferential sealing groove 6 of the male end fitting 1. In the known way, the internal section of this female end fitting 10 has a narrowing 17 axially below the groove 13.

According to the invention, the coupling end 20 of the device is formed by several tabs 21 that are elastically deformable in radial bending (there are two of these in this exemplary embodiment and they are in the form of lobes) which are included in a locking member 30 of the device forming the lower end thereof. As illustrated in FIGS. 2 to 4, this member 30 is made of a plastic with good mechanical strength such as a polyamide for example, and in this exemplary embodiment it comprises:

two diametrically opposite grasping means 31 and 32 forming an upper end of the member 30 and having two radial surfaces 31a and 32a intended to receive manual thrust from an operator toward the female end fitting 10, two linking portions 33 and 34 supporting and connecting these grasping means 31 and 32 to an annular portion 35 situated below, each portion 33, 34 extending radially inward under a grasping means 31, 32, this cylindrical annular portion 35 which is intended to be mounted in contact with the male end fitting 1 from and above the discontinuity 5 thereof, a bearing zone 36 which is radially innermost for the member 30 and which is intended to be mounted against the male end fitting 1 directly under the discontinuity 5, and the two circularly arcuate coupling tabs 21 which extend the bearing zone 36 downward and radially outward, forming the lower end of the device, and which are each able to be jammed in the locking position against the groove 13 by their bending generated by two corresponding ramps 7 that guide these tabs 21 and aid with locking, these ramps being formed as radial projections on the male end fitting 1.

Figure 8:
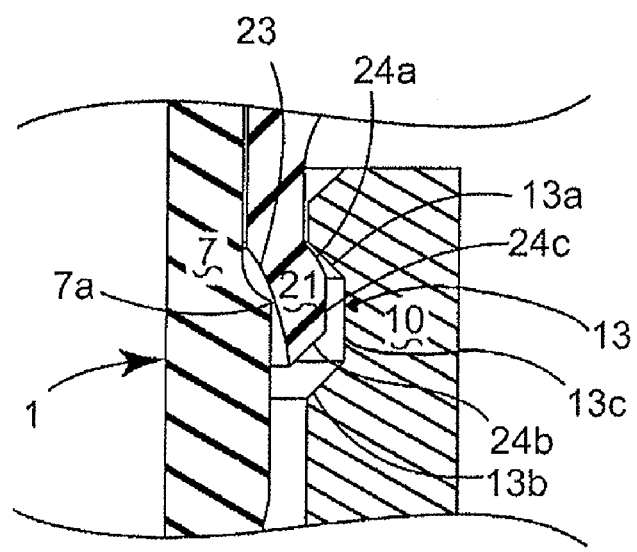
FIG. 8 is a detailed view of the coupling end of the device of FIG. 7 locked with this self-locking effect in the female end fitting.

More specifically, the tabs 21 are relatively slender and are joined together by two notches 22 the axial height of which is designed to make these tabs 21 elastically deformable in radial bending and which may optionally give the bearing zone 36 a discontinuous geometry (likewise in the form of circular arcs). Each tab 21 has an internal face 23 which is oblique or slightly concave intended to be mounted in contact with and on each side of an edge face 7a of the corresponding ramp 7 in the locking position, and an external face 24a to 24c which is convex with a radius of curvature that espouses the profile of the groove 13. As can be seen in FIG. 8, this external face comprises two, upper 24a and lower 24b, oblique sections and an intermediate third section 24c these respectively being intended to espouse the two flared edges 13a and 13b and the flat bottom 13c of the groove 13.

As for the ramps 7, these are formed diametrically opposite one another on the male end fitting 1 and at one and the same axial height just like the tabs 21 that they are intended to guide axially and to stress radially, each ramp 7 having (see FIG. 3) an upper oblique portion 7b extending radially outward and downward at an acute angle as far as the edge face 7a, a cylindrical axial portion 7c extending downward from this edge face 7a, and a lower oblique portion 7d.

The male end fitting 1 further comprises, arranged between the ramps 7, two centering rails 8 formed in this example of axial ribs, which are intended to guide the end fitting 1 angularly in a translational movement in the female end fitting 10 to enable the centering of the tabs 21 at the entry to the groove 13.

According to another important aspect of the invention that can be seen in FIGS. 3 to 7, the locking member 30 further incorporates into its upper end a tongue 37 that is designed to make the coupling of the tabs 21 to the groove 13 more secure in collaboration with a retaining tooth 9 of the male end fitting 1 (it will be noted that, as an alternative, it would be possible to provide several tongues 37 collaborating with as many retaining teeth 9). The tongue 37 is formed on a radially internal edge of one of the two thrust surfaces 31a of the grasping means 31 and 32, and is designed to be jammed directly under the tooth 9 which extends the bearing surface 4 of the end fitting 1 radially outward. This then, through a reversible axial wedging effect, gives a safety catch for the locked position of the tabs 21 in the groove 13, because the clipping of the tongue 37 under the tooth 9 prevents any untimely riding of the locking member 30 about the male end piece 1 (as visible in FIG. 4, there is thus also a safety catch in upper position of the member 30, where the tongue 37 surmounts the tooth 8).

Figure 5:
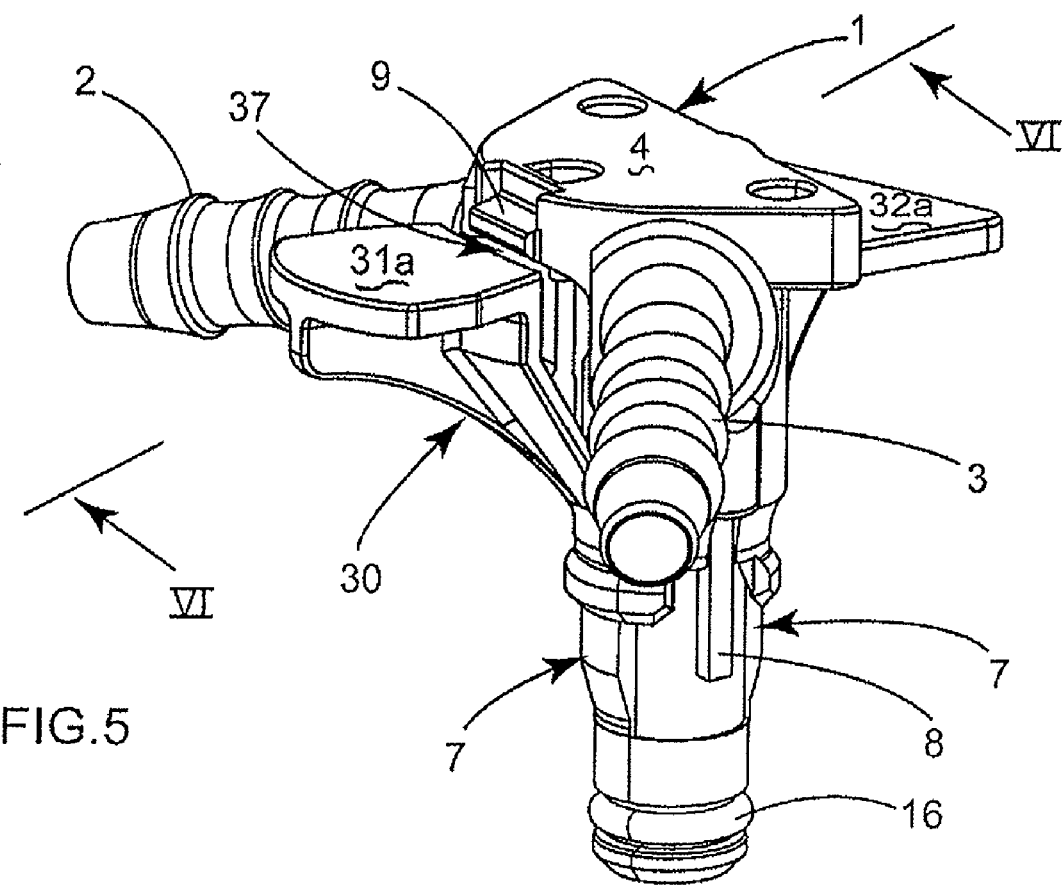
FIG. 5 is an assembled perspective view of the device of FIG. 3 mounted on the same male end fitting but in a position in which its coupling end is locked.
Figure 6:
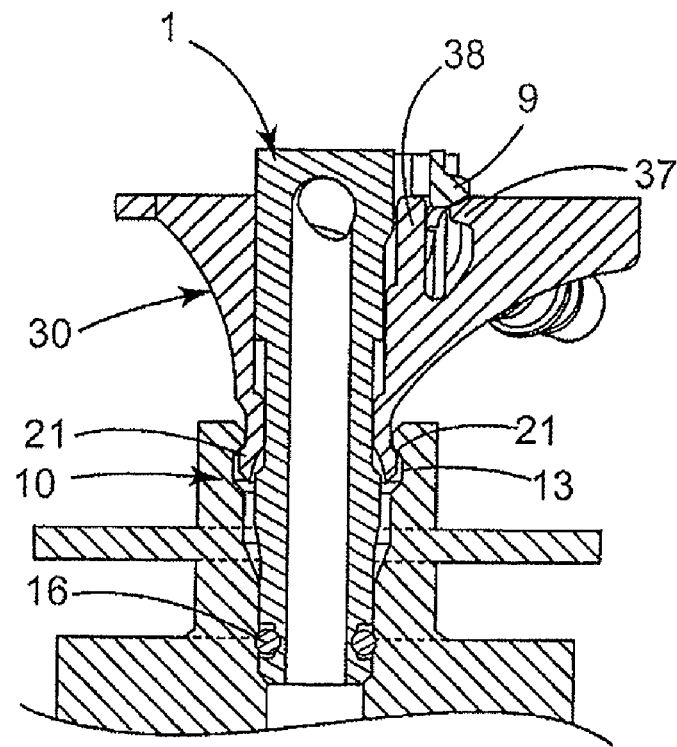
FIG. 6 is a view in axial section on VI-VI of FIG. 5 of this device illustrated in this locked position inside the female end fitting.
Figure 7:
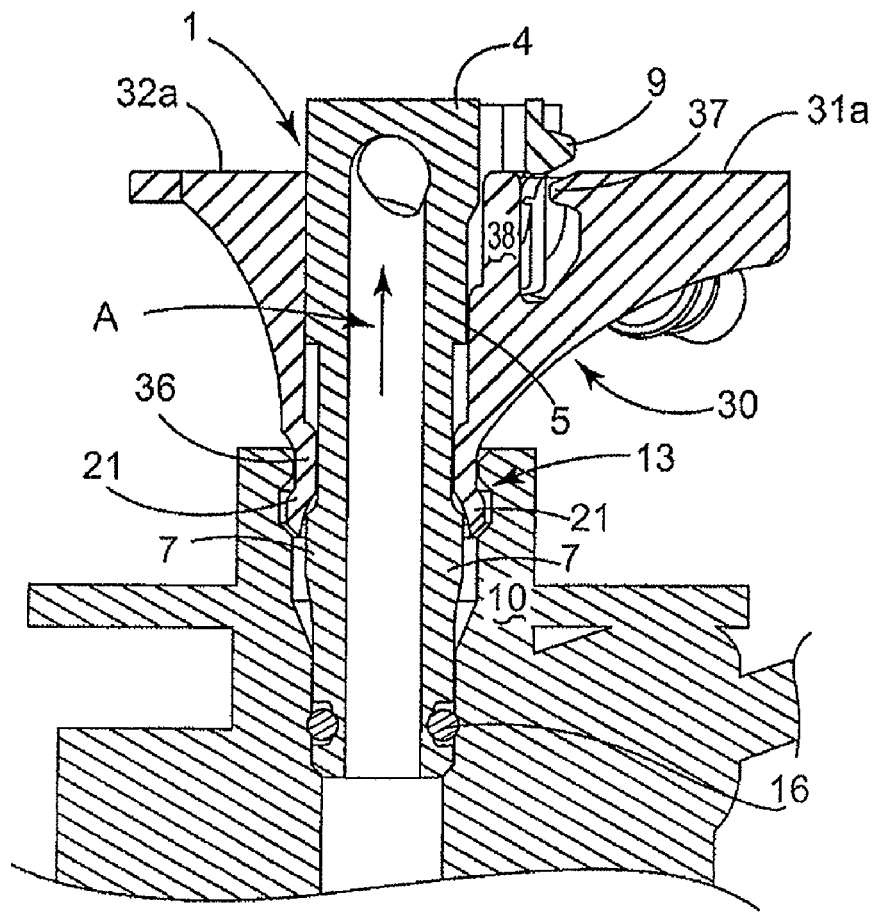
FIG. 7 is a view in axial section of this coupling device locked in the female end fitting analogous to that of FIG. 6 but also showing the self-locking effect obtained by this device on contact with the male end fitting.

The member 30 finally incorporates a visual locking indicator 38 which is visible on the male end fitting 1 in the unlocked position of FIGS. 3 and 4 and nonvisible on this end fitting 1 in the locked position of FIGS. 5 to 7, and which consists of an axial pin 38 formed as a single piece with the member 30 radially on the inside of the tongue 37 and capable of axial translational movement with the member 30 inside a through-housing 4a of the end fitting 1 opening onto the bearing surface 4 thereof. This pin 38 is advantageously in a contrasting color to that of the end fitting 1 to make it easier for the operator to see the unlocked position in which it lies flush with the bearing surface 4. In the locked position which is obtained by pushing downward on the member 30, the pin 38 is driven relative to this surface 4 because of the clipping of the tongue 37 under the tooth 9, thus not being visible to the operator.

As illustrated in FIGS. 4 to 6, the following procedure is followed in order to lock and then unlock the coupling of the tabs 21 in the groove 13 of the female end fitting 10:

a) the member 30 is positioned around the male end fitting 1 in such a way that the tabs 21 preferably lie over the ramps 7 (see FIG. 3), b) the end fitting 1 is pushed right into the female end fitting 10 to connect it thereto in abutment, so that the tabs 21 immediately come above the groove 13 (see FIG. 4), being centered accurately on the female end fitting 10 by virtue of the ribs 8 of the end fitting 1, c) downward thrust is exerted on the member 30 via a clipping of the tongue 37 under the tooth 9 (which results in the pin 38 disappearing from sight) in order to bring the tabs 21 into the secured locking position in the groove 13 (see FIG. 6), through their radial bending in contact with the ramps 7 which have guided them into then wedged them in this groove, and d) for unlocking the device, an upward pulling force is applied to the member 30 while at the same time keeping the male end fitting 1 against the closed end of the female end fitting 10.

It will be noted that the small diameter of the tabs 21 minimizes the force required to achieve the locked position in step c), it being emphasized that when establishing the coupled status there is no accumulation of the respective forces associated with the tabs 21 and with the seal 16.

Finally, and as illustrated in FIGS. 7 and 8, the device according to the invention has the advantage of being "self-locking" in operation, under the effect of the pressure of the fluid passing through the male end fitting 1 (see arrow A in FIG. 7 for this circulation of fluid), thanks to the ramps 7 which then force the tabs 21 evermore radially against the groove 13 leading to the fact that a very high pull-out force is required in order to unlock the device.

The invention claimed is:

1. Coupling device for a fluid transfer line comprising:
a male tubular end fitting;
a connection means intended to be mounted around the male end fitting by being coupled to a female tubular end fitting by a radially internal face thereof, this means of connection comprising an axially interior coupling end able to become housed in a coupling groove of said internal face; and
a locking member for locking said connection means, which locking member is configured to be mounted around the male end fitting in order reversibly to bring said coupling end into a locked position in said groove, wherein the connection means is formed as a single piece with the locking member of which it forms an axially interior end, the connection means comprising a radially internal bearing zone configured to be mounted against the male end fitting and ending in said coupling end, which comprises at least two tabs that are elastically deformable in the radial direction and extend the bearing zone radially outward, the radially external face and internal face of each tab being able to be jammed in the locked position, by a flexing of the tabs, respectively against said groove and against corresponding guide and locking-aid ramps disposed on the male end fitting and which are respectively associated with said tabs;
wherein the external face of each tab has a convex surface comprising two, axially outer and inner oblique sections and an intermediate third section which are respectively configured to espouse two flared edges and a flat bottom of said groove; and
wherein each of said ramps has an upper oblique portion extending radially outward and axially inward at an acute angle as far as said edge face, and an axial portion extending axially inward from this edge face, each of said tabs in the locked position straddling these two upper and axial oblique portions on either side of this edge face, so that said ramps alone jam during operation the corresponding tabs in said groove with these ramps deforming these tabs radially outward.

2. Coupling device according to claim 1, wherein each coupling tab has on its internal face an oblique or slightly concave surface intended to be mounted in contact with said edge face of said one or more corresponding ramps in the locked position.

3. Coupling device according to claim 1, wherein said coupling tabs are each circularly arcuate and joined together by so many notches that are designed to make these tabs sufficiently deformable in terms of radial bending.

4. Coupling device according to claim 1, wherein the locking member comprises:
a radially internal annular portion which is configured to be mounted in contact with the male end fitting and which has an internal diameter greater than that of said bearing zone that this portion surmounts, and
grasping means forming an axially outer end of the locking member, there being two diametrically opposed grasping means, each having a radial thrusting surface which is configured to receive a manual thrust from an operator toward the female end fitting and which is supported and connected to this annular portion by a linking portion extending axially and radially inward.

5. Coupling device according to claim 4, wherein at least one means of making the coupling of the connection means to said groove more secure is formed on the locking member in the immediate vicinity of said grasping means and is configured to be wedged directly under at least one radial projection of the male end fitting in a locked position so as to oppose extraction of said coupling end from the groove by a riding-up of the locking member in relation to the male end fitting.

6. Coupling device according to claim 5, wherein said or each radial projection is formed of a retaining tooth which extends a central bearing surface of the male end fitting radially outward and under which there can be wedged, by clipping, at least one tongue that forms said means of making the coupling more secure and that extends one of said grasping means radially inward.

7. Coupling device according to claim 1, wherein the locking member further incorporates a visual locking indicator which is respectively visible and nonvisible on the male end fitting in the unlocked and locked positions and which comprises at least one axial pin formed as a single piece with the locking member at its axially outer end, being configured for translational movement inside a housing that opens onto a bearing surface of the male end fitting.

8. Coupling device according to claim 1, wherein the male end fitting on which the locking member is mounted has said one or more corresponding ramps projecting radially, spaced apart around its circumference and at the same axial height.

9. Coupling device according to claim 8, wherein said coupling device includes a pair of said corresponding ramps that each end in a lower oblique portion, wherein said pair of corresponding ramps are positioned diametrically opposite each other on the male end fitting just like said tabs that are configured to come into contact with said corresponding ramps in the locked position.

10. Coupling device according to claim 9, wherein the male end fitting further comprises, between said corresponding ramps, a centering means configured to guide the male end fitting translationally in the female end fitting to facilitate angular centering of said coupling tabs on entering said groove.

11. Coupling device according to claim 10, wherein said centering means comprises one or more axial ribs.

12. Coupling device according to claim 8, further comprising at least one seal which is mounted or overmolded in a sealing groove of the male end fitting adjacent to an axially interior end of this male end fitting and which is configure to be pressed against the female end fitting.

13. Coupling device according to claim 12, wherein said at least one seal comprises an O-ring.

14. A fuel injector return circuit comprising a male tubular end fitting coupled to a female tubular end fitting by the coupling device of claim 1.

15. Method for fitting/removing a coupling device comprising the following steps:
 providing a coupling device having
 a male tubular end fitting,
 a connection means intended to be mounted around the male end
 fitting by being coupled to a female tubular end fitting by a radially internal face thereof, this means of connection comprising an axially interior coupling end able to become housed in a coupling groove of said internal face, and
 a locking member for locking said connection means, which
 locking member is configured to be mounted around the male end fitting in order reversibly to bring said coupling end into a locked position in said groove,
 wherein the connection means is formed as a single piece with the locking member of which it forms an axially interior end, the connection means comprising a radially internal bearing zone configured to be mounted against the male end fitting and ending in said coupling end, which comprises at least two tabs that are elastically deformable in the radial direction and extend the bearing zone radially outward, the radially external face and internal face of each tab being able to be jammed in the locked position, by a flexing of each tab, respectively against said groove and against one or more of a corresponding guide and locking-aid ramp disposed on the male end fitting and which are respectively associated with said tabs, and wherein the method comprises the following successive steps for fitting the coupling device:
 positioning the locking member around the male end fitting in such a way that said coupling tabs are situated over said one or more corresponding ramps;
 pushing the male end fitting into the female end fitting to connect it thereto in such a way that said tabs are situated immediately over said coupling groove, and
 applying thrust axially inward to the locking member to bring said tabs into the locked position, through their radial deformation in bending in contact with said corresponding ramps.

16. Method for fitting/removal according to claim 15, further comprising the step of applying an outward axial pulling force to the locking member while keeping the male end fitting pushed against the end of the female end fitting in order to unlock the coupling device.

17. Method for fitting/removal according to claim 15, wherein said locking member comprises:
 a radially internal annular portion which is configured to be mounted in contact with the male end fitting and which has an internal diameter greater than that of said bearing zone that this portion surmounts, and
 grasping means forming an axially outer end of the locking member, there being two diametrically opposed grasping means, each having a radial thrusting surface which is configured to receive a manual thrust from an operator toward the female end fitting and which is supported and connected to this annular portion by a linking portion extending axially and radially inward, and wherein at least one means of making the coupling of the connection means to said groove more secure is formed on the locking member in the immediate vicinity of said grasping means and is configured to be wedged directly under at least one radial projection of the male end fitting in a locked position so as to oppose extraction of said coupling end from the groove by a riding-up of the locking member in relation to the male end fitting, and wherein the step of applying thrust axially inward to the locking member further includes the step of clipping of at least one tongue that forms said means of making the coupling of the connection means to said groove more secure under a corresponding retaining tooth that forms each projection such that the locking member is brought under said at least one radial projection of the male end fitting.

\* \* \* \* \*